United States Patent [19]

Schotter

[11] Patent Number: 5,022,607

[45] Date of Patent: Jun. 11, 1991

[54] BEND LIMITING STIFF LEADER AND RETAINER SYSTEM

[75] Inventor: Daniel K. Schotter, Tucson, Ariz.

[73] Assignee: Hughes Aircraft Company, Los Angeles, Calif.

[21] Appl. No.: 273,310

[22] Filed: Nov. 18, 1988

[51] Int. Cl.$^5$ ............................................. F41G 7/32
[52] U.S. Cl. ................................................. 244/3.12
[58] Field of Search ..................................... 244/3.12

[56] References Cited

U.S. PATENT DOCUMENTS

| | | | |
|---|---|---|---|
| 3,296,927 | 1/1967 | Olsson et al. | 89/1.8 |
| 4,573,647 | 3/1986 | Laten et al. | 244/3.12 |
| 4,770,370 | 9/1988 | Pinson | 244/3.12 |
| 4,796,833 | 1/1989 | Pinson | 244/3.12 |

Primary Examiner—Charles T. Jordan
Attorney, Agent, or Firm—R. M. Heald; R. A. Hays; W. Denson-Low

[57] ABSTRACT

A fiberoptic leader connected between a missile and a launch tube is paid out upon missile launch with a controlled degree of bend in the fiberoptic filament, and is furthermore protected from blast effects in the launch. The fiberoptic filament is stiffened within a leader comprised of a TEFLON sleeve insulating the fiberoptic filament. A protective sheathing of high tensile strength longitudinally wires are disposed about and encase the TEFLON sleeve, and in turn are encased within an outer sleeve. The stiffened leader is led along the longitudinal length of a C-shaped channel attached to the side of the missile. The channel is disposed upon a longitudinal portion of the missile. The stiffened leader is laid against and under one of the channel arms from the aft end of the missile, where the fiberoptic leader is fed out during launch, to a forward end of the missile and channel. The leader is then led across the width of the channel to the opposing arm of the C-shaped channel. The stiffened leader is then led partly aft along the opposing arm of the channel and then out to an open longitudinal slot defining the ends of the C-shaped channel. That end of the stiffened leader is coupled to a fixed point within the launch tube from which point optical communications are provided to the missile during flight. As the missile is launched, the bend propagates down the channel tearing the stiffened leader from a longitudinally perforated tape which secures the leader into and under one of the arms of the channel.

20 Claims, 3 Drawing Sheets

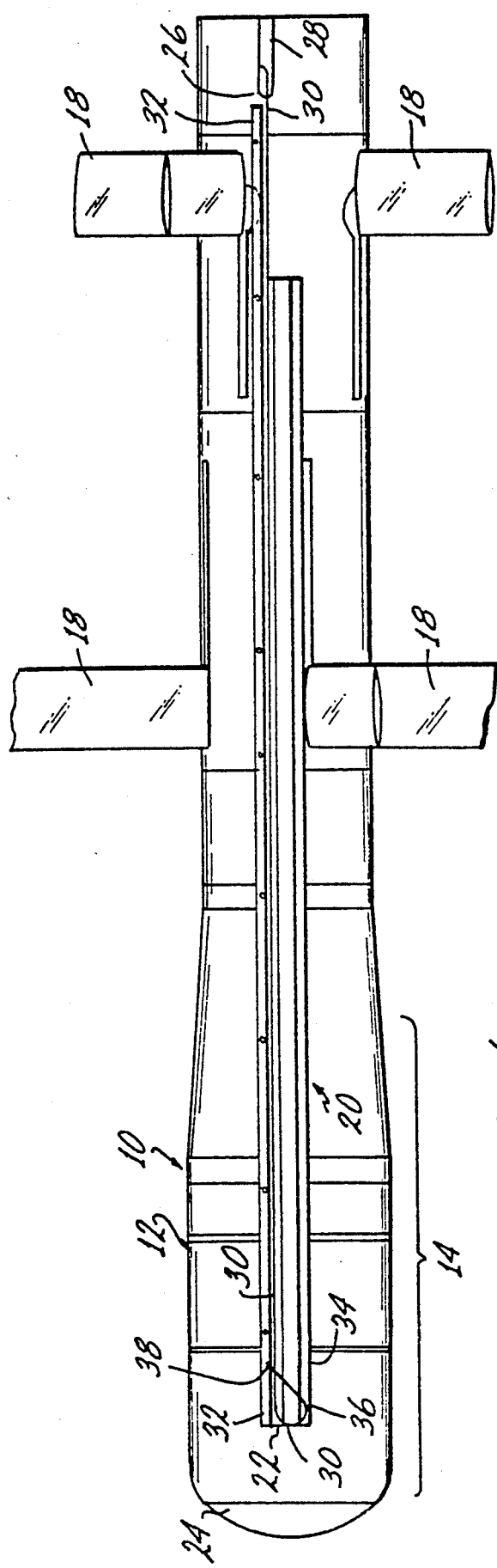
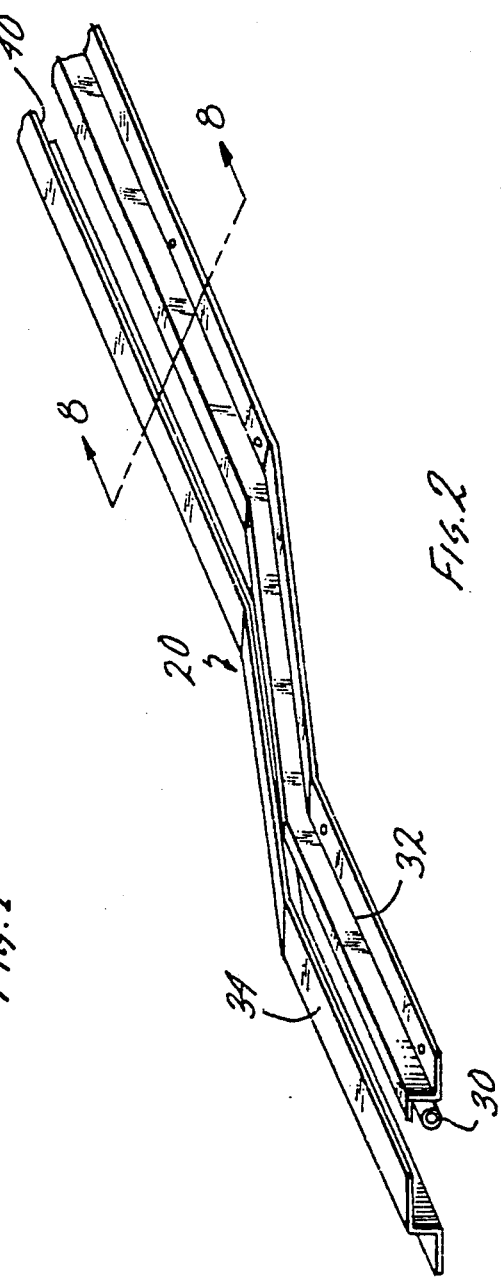

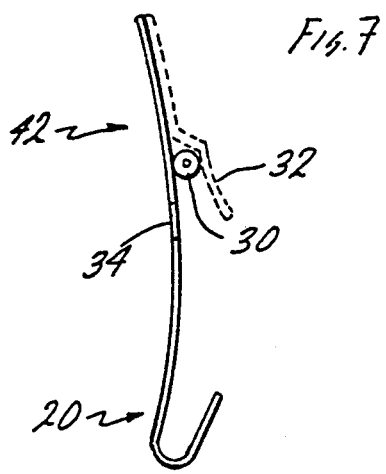
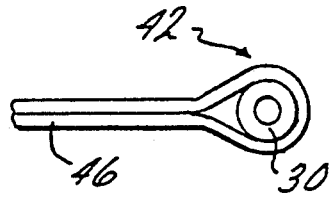
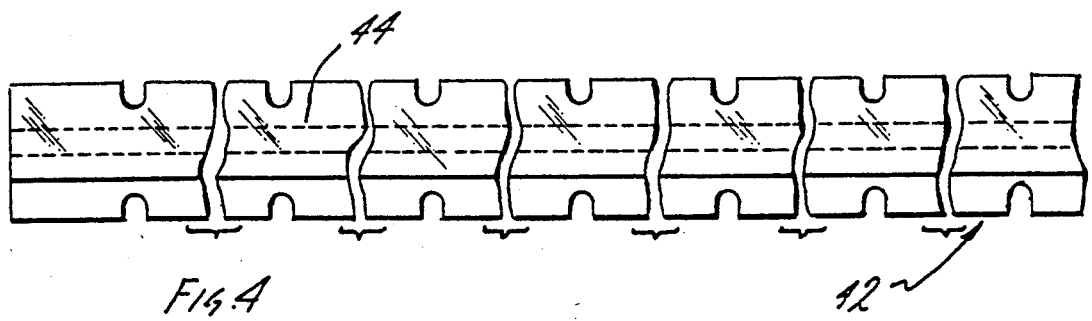
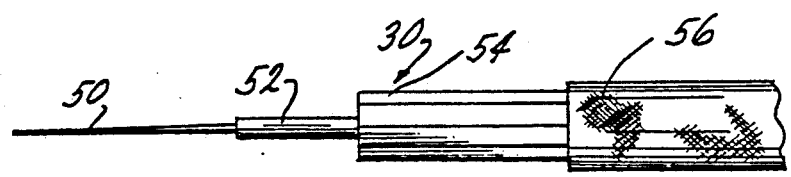

BEND LIMITING STIFF LEADER AND RETAINER SYSTEM

BACKGROUND OF THE INVENTION

1. Field of the Invention

The invention relates to the field of optically guided missiles and in particular to an optical guide-by-wire missile with a retainer system which provides constant loading on optical fiber leader and which controls the radius of bend during payout of the optical fiber during missile launch.

2. Description of the Prior Art

Guide-by-wire missiles are well known and have been used since at least World War II. Typically, such missiles use a metallic wire which is used to communicate guidance control commands to the missile while in flight. The wire is normally contained within a spool included within the missile body. It is led from the spool and attached to the missile by some means, typically a folded piece of adhesive tape which extends along the longitudinal length of the missile body. The wire then emerges from the adhesive tape at the missile nose and is attached to an appropriate fitting in the stationary launch tube in which the missile is disposed. The missile is fired, and moves down the length of the launch tube tearing the wire from the adhesive tape covering. After the missile has left the launch tube, the wire is completely stripped from the adhesive tape covering and begins to be played out by the spool. Electrical signals and commands can then be bidirectionally communicated along the wire.

In such prior art fly-by-wire missiles, the wire is highly malleable and resistant to the blast effect within the launch tube. Generally, the only mechanical concern with respect to the wire and its payout is that the wire be sufficient to withstand the tensile loads to which it will be subjected during launch and flight.

However, more recently, fly-by-wire missiles have become substantially more complex and require communication of a great deal more information during the relatively small flight time. For this purpose, fiber optic filaments have been substituted for metallic wires and optical signals for electrical signals. It is clearly very important that communication with the missile must be maintained during launch and flight. This becomes substantially more difficult when utilizing fragile fiberoptic filaments which are more susceptible to damage during handling and launch, not malleable, are very brittle and therefore can suffer only a limited degree of bending without fracture.

What is needed, then, is some type of system where a fiberoptic filament may be connected between the missile and its launch tube so that the fiberoptic cable may withstand the heat and blast effects of the launch and yet to prevent the cable from being bent so severely as to degrade or destroy the fiberoptic filament.

BRIEF SUMMARY OF THE INVENTION

The invention is an apparatus for coupling a fiberoptic lead to a moving object launched from a predetermined location comprising a retainer mechanism attached to the object. The fiberoptic lead is disposed within the retainer mechanism. The retainer mechanism confines the fiberoptic lead within a predetermined longitudinal space defined by the retainer mechanism. A tape temporarily secures the fiberoptic lead within the retainer mechanism. The tape releases the fiberoptic lead from the retainer mechanism as the object is moved and as the fiberoptic lead is extended between the moving object and the predetermined location.

As a result bending of the fiberoptic lead is controlled and breakage is avoided.

The apparatus further comprises a leader for protecting and encasing the fiberoptic lead. The leader provides a predetermined degree of stiffness so that bending of the fiberoptic lead is further controlled.

The leader comprises a plurality of longitudinal resilient elements which are laid parallel to the fiberoptic filament, and which collectively encircle the fiberoptic filament to encase the filament.

Each of the resilient elements is a high tensile strength metallic wire. The leader further comprises an insulating jacket disposed and encasing the fiberoptic filament. The insulating jacket is disposed within and encased by the plurality of resilient elements. The leader further comprises tubular sleeving disposed on and encasing the plurality of resilient elements so that the tubular sleeving is retained within a cylindrical assembly about the insulated fiberoptic filament.

The tape comprises an adhesive bearing, perforated tape adhered to the fiberoptic filament and also adhering to the retainer mechanism. The perforated tape is characterized as a longitudinal strip of tape having longitudinal perforations defined therethrough of predetermined perforation size and spacing.

The retainer mechanism is comprised of a generally C-shaped retainer affixed to the object, having two opposing overhanging arms, and opening outwardly away from the object. The fiberoptic filament is disposed within one overhanging arm of the C-shaped retainer along the longitudinal length of the retainer to a forward end of the retainer. The fiberoptic filament is bent across the C-shaped retainer to the opposing arm of the C-shaped retainer and extended from and through the outward opening of the C-shaped retainer for fixed attachment to the predetermined location. The C-shaped retainer comprises a lower retainer portion having a principal surface adapted for attachment to and conforming to the object and formed at one end extending from the object to form one arm of the C-shaped retainer. An upper retainer portion is arranged and configured to form the other arm of the C-shaped retainer. The other arm covers and protects the fiberoptic filament led along the longitudinal length of the C-shaped retainer.

The invention is also characterized as a fiberoptic leader retainer for guiding a fiberoptic filament connected between a missile and a launch tube comprising a longitudinally disposed channel disposed along at least part of the longitudinal length of the missile. The channel has a longitudinal slot defined therethrough along the entire length of the channel. A stiff leader encases the fiberoptic filament. The leader is disposed within the channel along the longitudinal length of the channel and is led to a forward end of the channel along one side of the channel. The leader is then bent across the channel to the opposing side of the channel, and lead from the channel through the slot to a predetermined location in the launch tube.

As a result, bending of the fiberoptic filament during launch of the missile is controlled, breakage is avoided, and the fiberoptic filament is protected from blast within the launch tube.

The invention is still further a method for paying out a fiberoptic leader between a missile and a launch tube comprising the steps of providing a channel along the side of the missile, and disposing a stiffened fiberoptic leader assembly within the channel. The channel is disposed along at least part of the longitudinal length of the missile and has a slot defined through the longitudinal length of the channel. The stiffened fiberoptic leader is disposed along one side of the channel from an aft end of the channel to a forward end of the channel, and then bent across the channel to an opposing side of the channel. The leader is led at least partially aft along the opposing side of the channel. The stiffened leader end is disposed through the slot in the channel to a predetermined location within the launch tube. The missile is launched from the launch tube while the end of the stiffened leader remains fixed to the launch tube in a stationary position. The bent portion of the stiffened fiberoptic leader is propagated down the channel as the missile is launched, while the curvature of the bent portion of the stiffened fiberoptic leader is maintained between the sides of the channel as the bent portion is propagated along the length of the channel during missile launch.

The invention is better visualized by now turning to the following drawings wherein like elements are referenced by like numerals.

BRIEF DESCRIPTION OF THE DRAWINGS

FIG. 1 is a simplified, side elevational view of a missile having a retaining track and a fiberoptic leader devised according to the invention.

FIGS. 2 and 3 are perspective views of retainer tracts, according to the invention, shown in isolation and detached from the missile.

FIG. 4 is plan view of a portion of the perforated tape which encloses the fiberoptic leader as seen when folded flatly.

FIG. 5 is a cross-sectional view of the fiberoptic leader enclosed within the tape of FIG. 4 after it has been folded to capture the leader.

FIG. 6 is a side, elevational view of the fiberoptic leader shown with various portions cut away to illustrate its composition.

FIGS. 7 and 8 are cross-sectional views of retainers shown in FIGS. 3 and 2, respectively.

Figure 8:
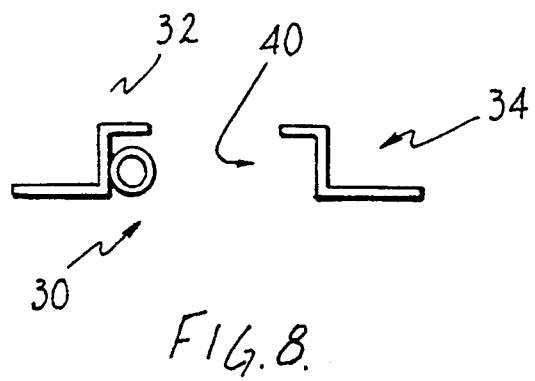

The invention and its various embodiments may be better understood by now turning to the following detailed description.

DETAILED DESCRIPTION OF THE PREFERRED EMBODIMENTS

A fiberoptic leader connected between a missile and a launch tube is paid out upon missile launch with a controlled degree of bend in the fiberoptic filament, and is furthermore protected from blast effects in the launch. The fiberoptic filament is stiffened within a leader comprised of a TEFLON sleeve insulating the fiberoptic filament. A cylindrical sheathing of high tensile strength, longitudinally oriented wires are disposed about and encase the TEFLON sleeve, and in turn are encased within an outer sleeve. More particularly, the wires may lie along the TEFLON sleeve. The stiffened leader is led along the longitudinal length of a C-shaped channel attached to the side of the missile. The channel is disposed upon a longitudinal portion of the missile. The stiffened leader is laid against and under one of the channel arms from the aft end of the missile, where the fiberoptic leader is fed out during launch, to a forward end of the missile and channel. The leader is then led across the width of the channel to the opposing arm of the C-shaped channel. The stiffened leader is then led partly aft along the opposing arm of the channel and then out to an open longitudinal slot defining the ends of the C-shaped channel. That end of the stiffened leader is coupled to a fixed point within the launch tube from which point optical communications are provided to the missile during flight. As the missile is launched, the bend propagates down the channel tearing the stiffened leader from a longitudinally perforated tape which secures the leader into and under one of the arms of the channel.

FIG. 1 shows in simplified side elevational view a missile, generally denoted by reference numeral 10, which has been fitted with a fiberoptic leader devised according to the invention. In the illustrated embodiment missile body 12 is comprised of a leading bull-nose portion 14 followed by a cylindrical body portion of a reduced diameter which may include a plurality of fins or other control surfaces 18 projecting therefrom. A retaining track, generally denoted by reference numeral 20, is screwed, bolted or otherwise attached to the side of missile 10 and extends longitudinally along the missile body from a point 22 near nose 24 of missile 10 to a rear point 26 where the fiberoptic leader leaves retaining track 20 and transitions into a spooling, payout mechanism internally carried within the missile. The payout mechanism and its transition 28 from retaining track 20 is not relevant to the invention and will thus not be further described.

A fiberoptic leader 30 is in any case led from transition 28 underneath a top retainer 32 which is attached to the missile body. Opposing top retainer 32 is a bottom retainer 34 which retainers 32 and 34 together comprise retaining track 20.

The fiberoptic leader 30, which is described and shown in greater detail in connection with FIG. 6, is enclosed within a folded piece of fiber reinforced perforated adhesive tape, shown and described in greater detail in connection with FIGS. 4 and 5, and which is sold under the trademark, GENTAPE™, by a company of the same name. Leader 30 exits the tape near end 22 and forms a loop 36 which extends from top retainer 32, across the missile body to the bottom retainer 34, and thence is led outwardly between top and bottom retainers 32 and 34 to an anchor point of attachment within the launch tube. As will be described in greater detail in connection with FIG. 6, end 38 of leader 30 is fastened by a lug to the launch tube (not shown), and it is through end 38 that optical communications are provided to missile 10.

Before considering the payout of the fiberoptic leader within the launch tube and the retaining track of FIG. 1, first turn to the perspective view of retaining track 20 as shown in FIG. 2. Retaining track 20 as shown in isolation from the missile body, but with top retaining track 32 and bottom retaining track 34 shown in relationship to each other in the same manner as would be obtained when the tracks are attached to the missile body.

The perspective view of FIG. 2 clearly illustrates the S-shaped bend of retaining track 20 which conforms to the exterior shape of missile 10. It must be clearly understood that the three-dimensional shape of retaining track 20 may be modified as may be appropriate for each individual missile body. However, the illustration of FIG. 2 does illustrate the flexibility by which complex missile body shapes may be accommodated by the retaining track of the invention.

FIG. 2 should further be noted particularly for showing disposition of fiberoptic leader 30 under top retainer 32 as best shown in the left hand end of FIG. 2. In addition, slot 40 can be seen to run the longitudinal length of retaining track 20 allowing fiberoptic leader 30 to be pulled from retaining track 20 as the missile is launched from the launch tube.

FIG. 8 is a cross-sectional view of FIG. 2. FIG. 8 also illustrates that bottom retainer 34 is disposed below top retainer 32, both of which are then screwed or bolted onto the missile body. Fiberoptic leader 30 is retained beneath the overleaf of top retainer 32 and held therein by means of a folded piece of tape 42.

Figure 3:
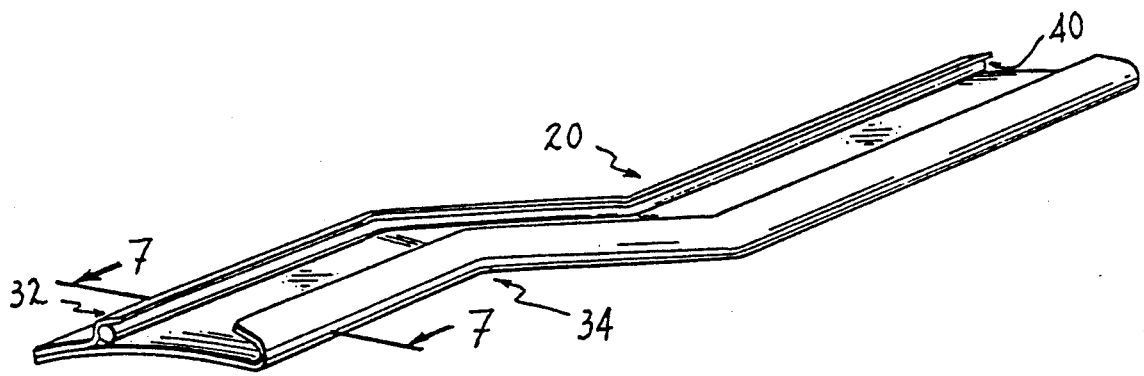

FIG. 3 is a perspective view of another retainer system according to the invention. The configuration of retaining track 20 can also be better understood by considering FIG. 7, a cross-sectional view of FIG. 3 taken through lines 7—7. FIG. 7 also illustrates that bottom retainer 34 is disposed below top retainer 32 and both are then screwed or bolted into a missile body. As in the retainer shown in FIG. 2, the fiberoptic leader is retained beneath the overleaf of top retainer 32 and held therein by means of a folded piece of GENTAPE 42.

Tape 42 is better illustrated in plain view in a form which would be seen if it were laid out flatly as shown in FIG. 4 and then in its folded form shown in FIG. 5 in isolation of its position within retaining track 20. The tape is a fiber reinforced adhesive tape with a longitudinal line of perforations 44 defined along its length. The inside surfaces of tape 42 carry a self-adhesive film which allows the tape to be folded over and to adhere both to fiberoptic leader 30 and to itself when placed in the configuration of FIG. 5. Moreover, one surface portion 46 of tape 42 is also provided with a strip of adhesive which allows tape 42 to be attached to bottom retainer 34 along its upper edge as depicted in FIG. 3. Thereafter, upper retainer 32 is placed upon bottom retainer 34 and if desired on tape 42 as well and then the assembly is tightly fastened to the missile body.

As fiberoptic leader 30 is pulled from retainer track 20, it will be torn from tape 42 with breakage occurring along the line of perforations 44. The resistance to tearing can be easily controlled by the degree of fiberoptic reinforcing within tape 42 and the size and repetition of perforations 44 defined along its tear line. In any case, tape 42 provides an even and constant loading on fiberoptic leader 30 as it is torn from tape 42 during missile launch.

Turn now to FIG. 6 wherein the details of fiberoptic leader 30 are illustrated. Fiberoptic leader 30 is comprised of a fiberoptic filament 50 at the core of leader 30. A protecting sleeve 52 is disposed over optical fiber filament 50 and serves to protect filament 50 from abrasion, nicks, contamination and other wear which may affect the optical performance of the filament. Sleeve 52 may be a sleeve made of TEFLON TM. The diameter of sleeve 52 is approximately 0.04 inch and is encased within six steel music wires, which in the illustrated embodiment are approximately 0.021 inch in diameter. Sleeve 52 lubricates the relative movement of wires 54 with respect to filament 50. Wires 54 are laid longitudinally along the length of sleeved filament 50 without weaving, breaking or twisting. Wires 54 provide a flexible armor jacket which can provide a predefined degree of stiffness to leader 30. Wires 54 in turn are bundled or encased within sleeving 56 which is a plastic or insulating sleeve which serves to protect and provide a binding casing for wires 54. In the illustrated embodiment the insulating sleeve is comprised of woven KEVLAR TM.

Thus, it may now be understood that at end 38 of fiberoptic leader 30, the leader is withdrawn from retaining track 20 through slot 40 and a length of sleeve 56 stripped away. Wires 54 are then bent 180 degrees over an encircling lug and crimped to the lug in conventional manner. The lug in turn has an eyelet which allows it to be bolted or screwed at an appropriate attachment point to the launch tube. With a portion of wires 54 folded back and crimped into the lug, optical fiber filament 50 and sleeve 52 are exposed and can be stripped and connected in a conventional manner to the output of an optical guidance system.

Returning to FIG. 1, it can now be appreciated that upon launch, as missile 10 moves out of the launch tube, fiberoptic leader 30 is torn from tape 42 and loop 36 propagates down retaining track 20 along the longitudinal length of the missile. In the illustrated embodiment loop 36 will emerge or be released from retaining track 20 when the missile is approximately three feet beyond the end of the launch tube. During such time as the fiberoptic leader is retained within retaining track 20, the curvature of loop 36 is maintained and defined by retaining track 20, and fiberoptic filament 50 is protected from the effects of the blast by sleeving 56, wires 54 and sleeve 52. An even and controlled amount of load is provided by the perforations within tape 42 while the stiffness and mechanical strength of fiberoptic leader 30 is maintained by the armor jacketing provided by wires 54.

In addition to providing for a uniform and controlled payout of the fiberoptic leader during launch, the invention also provides a unique packaging which allows for preassembly and subsequent fiber insertion into the fiber spool of the missile. In other words, the missile is delivered to the field with retaining track 20 in place. Fiberoptic leader 30 can then be quickly and easily connected to any fiberoptic spool mechanism without concern for special requirements or peculiarities of the fiberoptic filament actually paid out by the missile. The leader may be used on various types of optical fiber with the only limitation being the constraints which arise from the inner diameter of the tube and the outer diameter of the optical fiber. Once the leader is connected to the fiber optic spool, the leader and spool are then mounted as described onto the missile.

Therefore, the skill and time required to configure a missile for launch is significantly reduced and the reliability of a successful launch increased. The success of the fiberoptic guided missile is based on maintaining the delicate communication link between the missile and the launcher. This leader design and its retainer mechanism insures the integrity of the optical fiber during launch. A separate prefabrication assembly eliminates the risk of damaging the optical fiber during the handling required to manufacture the leader directly onto the spool.

Many modifications and alterations may be made by those having ordinary skill in the art without departing from the spirit and scope of the invention. Therefore, it must be understood that the illustrated embodiment has been set forth for the purposes of example and should not be taken as limiting the invention which is defined in the following claims.

I claim:

1. An apparatus for coupling a fiberoptic lead to a moving object launched from a predetermined location comprising:

retainer means attached to said object and adapted to the shape of said object, said fiberoptic lead being disposed within said retainer means, said retainer means for confining said fiberoptic lead within a predetermined longitudinal space defined by said retainer means, said retainer means comprising a generally O-shaped channel and two opposing overhanging arms, said lead being disposed within one overhanging arm along the longitudinal length of said channel to a forward end of said channel, said lead being bent across said C-shaped channel to said other opposing arm and extended from and through an outward opening of said channel for fixed attachment to said predetermined location and;

tape means for temporarily securing said fiberoptic lead within said retainer means, said tape means for releasing said lead from said retainer means as said object moves and as said lead is extended between said moving object and said predetermined location, whereby bending of said lead is controlled and breakage is avoided.

2. The apparatus of claim 1 further comprising leader means for protecting and encasing said fiberoptic lead, said leader means for providing a predetermined degree of stiffness so that bending of said fiberoptic lead is further controlled.

3. The apparatus of claim 2 wherein said leader means comprises a plurality of longitudal resilient elements laid parallel to said lead, and collectively surrounding said lead to protect said lead.

4. The apparatus of claim 3 wherein each said resilient element is a high tensile strength metallic wire.

5. The apparatus of claim 4 wherein said leader means further comprises an insulating jacket disposed about and encasing said lead, said insulating jacket being disposed within and encased by said plurality of resilient elements.

6. The apparatus of claim 5 wherein said leader means further comprises tubular sleeving disposed on and encasing said plurality of resilient elements so that said tubular sleeving is retained within a cylindrical assembly about said insulated fiberoptic filament.

7. The apparatus of claim 1 wherein said tape means comprises an adhesive bearing, perforated tape adhered to said leader means and also adhered to said retainer means.

8. The apparatus of claim 7 wherein said perforated tape is characterized as a longitudinal strip of tape having longitudinal perforations defined therethrough of predetermined perforation size and spacing.

9. The apparatus of claim 1 wherein said overhanging arms open outwardly away from said object.

10. The apparatus of claim 1 wherein said retainer means comprises a lower retainer portion having a principal surface for attachment to and conforming to said object, said surface formed at one end so as to extend from said object to form one arm of said retainer means, and an upper retainer portion arranged and configured to form said other arm of said retainer means, said other arm covering and protecting said lead along said longitudal length of said retainer means.

11. A fiberoptic leader retainer for guiding a fiberoptic filament connected between a missile and a predetermined location, said fiberoptic filament encased in a fiberoptic leader, said retainer comprising:

a channel disposed along at least part of the longitudinal length of said missile, said channel having a longitudinal slot defined therethrough along the entire length of said channel;

at least one overhanging arm extending from said channel along the longitudinal length of said channel;

said fiberoptic leader disposed within said overhanging arm along said longitudinal length of said channel and led to a forward end of said channel along one side of said channel, bent across said channel to said opposing side of said channel, and led from said channel through said slot to said predetermined location, whereby bending of said fiberoptic filament during launch of said missile is controlled, breakage is avoided and whereby said fiberoptic filament is protected from blast during launch.

12. The fiberoptic leader retainer of claim 11 wherein said leader comprises an inner protective sleeve disposed on and encasing said fiberoptic filament, and a resilient and flexible armor sheating longitudinally disposed about and encasing said inner sleeve.

13. The fiberoptic leader retainer of claim 12 wherein said resilient sheathing is a plurality of longitudinally laid, high tensile strength metallic wires forming a protective sheathing for said fiberoptic filament within said inner sleeve.

14. The fiberoptic leader retainer of claim 13 further comprising an outer sleeve disposed about and encasing said resilient sheathing.

15. The fiberoptic leader retainer of claim 11 further comprising means for temporarily affixing said leader within said channel.

16. The fiberoptic leader retainer of claim 11 further comprising means for providing a predetermined degree of resistance to removal of said stiff leader from said channel.

17. The fiberoptic leader retainer of claim 16 wherein said means for providing said predetermined degree of resistance is a longitudinal length of adhesive tape having longitudinal perforations of a predetermined hole size and hole separation, said adhesive tape adhered to said leader and to said channel.

18. The fiberoptic leader retainer of claim 11 wherein said channel is arranged and configured to at least partially cover said fiberoptic leader to protect said fiberoptic leader from the blast effects of launch.

19. A method for paying out a fiberoptic leader between a missile and a predetermined location comprising the steps of:

providing a channel along the side of said missile, said channel being disposed along at least part of the longitudinal length of said missile and having a slot defined through said longitudinal length of said channel;

disposing a stiffened fiberoptic leader assembly within said channel, along one side of said channel from an aft end of said channel to a forward end of said channel;

bending said fiberoptic leader across said channel to an opposing side of said channel;

leading said fiberoptic leader at least partially aft along said opposing side of said channel;

passing an end of said stiffened leader through said slot in said channel;

securing said end to a predetermined location;

launching said missile while maintaining said end fixed to said predetermined location in a stationary position; and propagating said bent portion of said stiffened fiberoptic leader down said channel as said missile is launched while maintaining the curvature of said bent portion of said stiffened fiberoptic leader between said sides of said channel as said bent portion is propagated along the length of said stiffened fiberoptic leader within said channel during missile launch.

20. The method of claim 19 further comprising the step of applying a predetermined resistive force to said stiffened leader as said leader is removed from said channel during said step of launching.

* * * * *

UNITED STATES PATENT AND TRADEMARK OFFICE
CERTIFICATE OF CORRECTION

PATENT NO. : 5,022,607
DATED : June 11, 1991
INVENTOR(S) : Daniel K. Schotter

It is certified that error appears in the above-identified patent and that said Letters Patent is hereby corrected as shown below:

Column 7, line 10 instead of "O-shaped" insert -- C-shaped --.

Signed and Sealed this

Eighth Day of December, 1992

Attest:

DOUGLAS B. COMER

Attesting Officer  Acting Commissioner of Patents and Trademarks